US007282817B2

(12) United States Patent
Paschen et al.

(10) Patent No.: US 7,282,817 B2
(45) Date of Patent: Oct. 16, 2007

(54) ELECTRICAL CIRCUIT ARRANGEMENT FOR CONTROLLING AN ELECTROMOTOR IN A MOTOR VEHICLE

(75) Inventors: Hartmut Paschen, Dortmund (DE); Michael Kassner, Fröndenberg (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 11/488,955

(22) Filed: Jul. 19, 2006

(65) Prior Publication Data

US 2006/0284486 A1 Dec. 21, 2006

Related U.S. Application Data

(63) Continuation of application No. PCT/EP2005/001274, filed on Feb. 9, 2005.

(30) Foreign Application Priority Data

Feb. 14, 2004 (DE) ...................... 10 2004 007 328

(51) Int. Cl.
*H02H 35/24* (2006.01)
*H02P 1/04* (2006.01)

(52) U.S. Cl. ...................... 307/115; 318/430; 318/139; 307/10.1

(58) Field of Classification Search ................ 307/115, 307/118, 10.1; 296/216.01; 318/139, 430, 318/431, 432, 433, 434
See application file for complete search history.

(56) References Cited

U.S. PATENT DOCUMENTS 4,328,451 A 5/1982 Barge
4,562,387 A 12/1985 Lehnhoff
4,575,662 A 3/1986 Lehnhoff
4,678,975 A 7/1987 Vrabel et al.
4,683,975 A 8/1987 Booth et al.
6,060,794 A * 5/2000 Takagi et al. ............... 307/125
6,157,152 A 12/2000 Sekine et al.
6,459,168 B1 * 10/2002 Miyake et al. ............. 307/10.1
6,486,630 B2 * 11/2002 Takagi ......................... 318/445
6,559,614 B2 5/2003 Kock et al.

(Continued)

FOREIGN PATENT DOCUMENTS

DE 43 38 707 A1 5/1995

(Continued)

*Primary Examiner*—Michael Sherry
*Assistant Examiner*—Andrew Deschere
(74) *Attorney, Agent, or Firm*—Brooks Kushman P.C.

(57) ABSTRACT

A motor control arrangement includes a device connected to positive power such that device drives motor upon connecting to negative power. A switch connects to positive power upon actuation. A first transistor connects to switch via controller and connects between device and negative power. First transistor turns on causing device to connect to negative power upon switch actuation while controller is operational. A second transistor connects to switch and connects between device and negative power when controller is malfunctioned. Second transistor turns on causing device to connect to negative power upon switch actuation while controller is malfunctioned. A sensor connects to negative power upon contact with water. A third transistor connects to switch and sensor such that its collector-emitter path is connected in parallel to device. Third transistor turns on to short-circuit device thereby preventing device from driving motor upon water contacting sensor while controller is malfunctioned and switch actuation is void.

20 Claims, 1 Drawing Sheet

U.S. PATENT DOCUMENTS

| | | | | |
|---|---|---|---|---|
| 6,690,096 | B2 * | 2/2004 | Sasaki | 307/10.1 |
| 6,690,131 | B1 | 2/2004 | Shimomura et al. | |

FOREIGN PATENT DOCUMENTS

| | | | |
|---|---|---|---|
| DE | 100 30 810 | A1 | 1/2001 |
| DE | 100 00 530 | A1 | 7/2001 |
| DE | 100 48 293 | A1 | 7/2002 |
| EP | 0 889 192 | A2 | 1/1999 |
| EP | 0 931 899 | A1 | 7/1999 |
| EP | 1 033 464 | A2 | 9/2000 |
| EP | 1 207 261 | | 5/2002 |
| JP | 2002 276241 | | 9/2002 |
| WO | WO 01/51302 | A1 | 7/2001 |

* cited by examiner

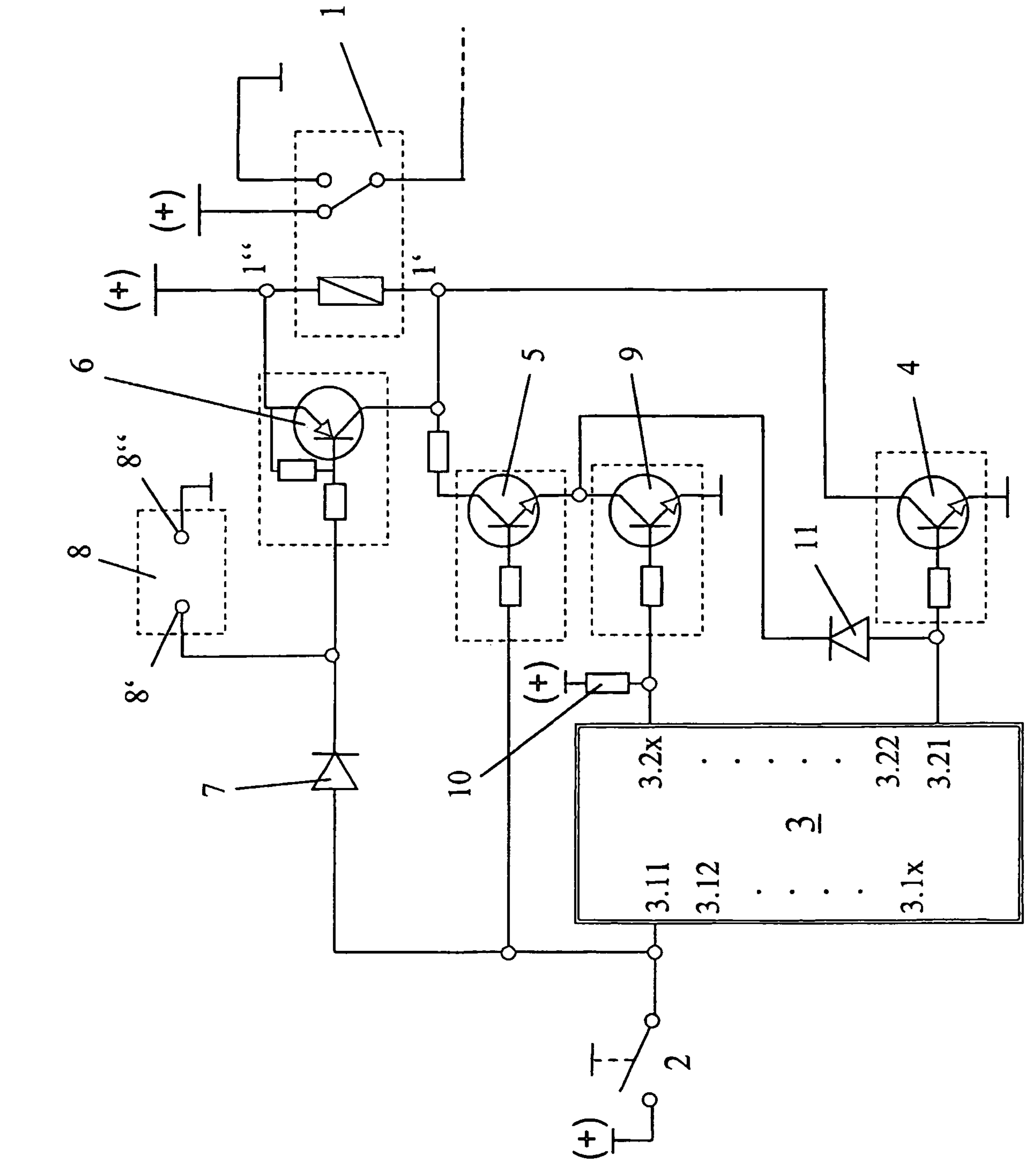
1
(+)
1''
1'
6
5
9
4
8
8''
8'
11
7
10
3
3.2x
3.22
3.21
3.11
3.12
3.1x
2

ELECTRICAL CIRCUIT ARRANGEMENT FOR CONTROLLING AN ELECTROMOTOR IN A MOTOR VEHICLE

CROSS-REFERENCE TO RELATED APPLICATIONS

This is a continuation of International Application PCT/EP2005/001274, published in German, with an international filing date of Feb. 9, 2005, which claims priority to DE 10 2004 007 328.7 filed Feb. 14, 2004, the disclosures of which are both hereby incorporated by reference.

BACKGROUND OF THE INVENTION

1. Field of the Invention

The present invention relates to an electric circuit arrangement for controlling a power switching element associated with an electric motor used to adjust a motor vehicle unit in which one of two inputs of the power switching element is connected to the positive pole of a power supply and the other input is connectable to the negative pole of the power supply by (a) a first transistor controlled by a controller via a manually actuated switch and (b) a second transistor directly controlled by the switch.

2. Background Art

Electric circuit arrangements are used to control electrically operated motor vehicle units such as window and sliding roof adjustment systems which are driven by electric motors. That is, the circuit arrangements control the electric motors associated with motor vehicle units in order to control the movement of the motor vehicle units. The circuit arrangements typically control the motor vehicle units in accordance with specification and regulatory requirements. Certain of these requirements require motor vehicle units to have an emergency opening mode in case of circuit arrangement malfunction. Circuit arrangements malfunction, for example, as a result of short circuiting due to contact with salt water.

The emergency opening mode of a motor vehicle unit comes into play when the motor vehicle is submerged in water such as a lake or an ocean as a result of an accident. The water may be deep enough such that the passengers of the motor vehicle have to escape through windows or a sliding roof of the motor vehicle. As such, the electric motors associated with the motor vehicle units still have to be controllable to open their associated motor vehicle units when, for example, elements of the circuit arrangements are short-circuited as a result of being submerged in water or salt water.

Commonly assigned U.S. Pat. No. 6,559,614 discloses an electric circuit arrangement for controlling a motor vehicle unit. This circuit arrangement uses mechanical changeover switches as manually actuated switches which allow selective connections of the same circuit node to different voltages. However, such switches are technically complicated and, as a result, are susceptible to malfunction because of their complexity.

SUMMARY OF THE INVENTION

An object of the present invention is to provide an electric circuit arrangement which enables the motor vehicle unit emergency opening mode without using mechanical changeover switches.

The electric circuit arrangement of the present invention generally achieves the above object and other objects by having a transistor in which the collector emitter path of the transistor is mounted parallel to the inputs of a power switching element and the base terminal of the transistor is connected via a diode to a manually actuated switch and to a water sensor formed by two neighboring electrical contacts.

In accordance with the above object and other objects, the present invention provides an electric circuit arrangement for controlling a power switching element (i.e., a "power element") associated with an electric motor used to adjust a motor vehicle unit such as a window or a sliding roof. The power element includes first and second inputs with the first input connectable to the negative pole of a power supply (i.e., "negative power") and the second input connected to the positive pole of the power supply (i.e., "positive power"). The power element drives the motor when the first power element input is connected to the negative power and the second power element input is connected to the positive power.

The circuit arrangement includes a switch, a controller, a water sensor, and first, second, and third switching transistors (i.e., "transistors"). The switch, such as a pushbutton switch, connects to the positive power upon manual actuation. The controller is connected to the switch. The first transistor is connected to the switch via the controller. The first transistor is connected in series with the power element such that the first transistor is connected between the first power element input and the negative power. The first transistor turns on causing the first power element input to connect to the negative power upon manual actuation of the switch while the controller is operational. The second transistor is connected directly to the switch. The second transistor is connected in series with the power element such that the second transistor is connected between the first power element input and the negative power when the controller is non-operational. The controller may become non-operational upon being immersed in water such as salt water. The second transistor turns on causing the first power element input to connect to the negative power upon manual actuation of the switch while the controller is non-operational. The water sensor connects to the negative power upon contact with water. The third transistor is connected to the switch via a diode and is connected to the water sensor. The third transistor is connected in parallel with the power element such that the collector emitter path of the third transistor is connected in parallel to the power element inputs. The third transistor turns on causing the power element to be short-circuited such that the power element is prevented from driving the motor upon water contacting the water sensor while the controller is non-operational and while actuation of the switch is void (i.e., while the switch is not being manually actuated).

The circuit arrangement may further include a fourth transistor connected to the controller and connected in series between the second transistor and the negative power. The controller turns off the fourth transistor such that the first power element input is disconnected from the negative power via the second transistor while the controller is operational. In this case, the fourth transistor is connected to the positive power via a pull-up resistor. The positive power connected to the fourth transistor causes the transistor to turn on while the controller is non-operational such that the second and fourth transistors are connected to the negative power causing the first power element input to be connected to the negative power.

In one embodiment, the power element includes an electromechanical relay connected between the power element inputs. In one embodiment, the controller includes a microprocessor. In one embodiment, the switch includes a pushbutton switch. In one embodiment, each transistor is a npn bipolar transistor. In one embodiment, the negative and positive powers are reversed and the transistor are pnp bipolar transistors.

Further, in carrying out the above object and other objects, the present invention provides an electric circuit arrangement for controlling an electric motor used to adjust a motor vehicle unit such as a window or a sliding roof. This circuit arrangement includes a power element having a first input connectable to negative power and a second input connected to positive power. The power element drives the motor upon the first input being connected to the negative power. This arrangement further includes a switch, a controller, a water sensor, and first, second, and third transistors. The switch connects to the positive power upon manual actuation. The controller is connected to the switch. The first transistor is connected to the controller and is connected in series with the power element such that the first transistor is connected between the first power element input and the negative power. While the controller is functional and upon the controller being connected to the positive power via the switch, the controller turns on the first transistor causing the first power element input to connect to the negative power. The second transistor is connected to the switch and is connected in series with the power element such that the second transistor is connected between the first power element input and the negative power when the controller is non-functional. The controller may become non-functional when immersed in water such as salt water. While the controller is non-functional and upon the second transistor being connected to the positive power via the switch, the second transistor turns on causing the first power element input to connect to the negative power. The water sensor connects to the negative power upon contact with water. The third transistor is connected to the switch and the water sensor and is connected in parallel with the power element such that the collector emitter path of the third transistor is connected in parallel to the power element inputs. While the controller is non-functional and while the switch is non-actuated and upon the third transistor being connected to the negative power via the water sensor, the third transistor turns on causing the power element to be short-circuited such that the power element is prevented from driving the motor.

Also, in carrying out the above object and other objects, the present invention provides another electric circuit arrangement for controlling a motor used to adjust a motor vehicle unit. This circuit arrangement includes a power element having a first input connectable to negative power and a second input connected to positive power. The power element drives the motor when the first input is connected to the negative power. This circuit, arrangement further includes a controller, a switch, a water sensor, and first, second, and third transistors. The controller has an input and an output. The switch has a first switch contact connected to the controller input and a second switch contact connected to the positive power. Upon manual actuation of the switch, the switch contacts connect such that the first switch contact connects to the positive power. The first transistor has a base terminal connected to the controller output, an emitter terminal connected to the negative power, and a collector terminal connected to the first power element input. While the controller is functional and upon the controller input being connected to the positive power via the switch, the controller outputs a control signal from the controller output to the base terminal of the first transistor to turn on the first transistor causing the first power element input to connect to the negative power. The second transistor has a base terminal connected to the first switch contact, an emitter terminal, and a collector terminal connected to the first power element input. The emitter terminal of the second transistor is connected to the negative power while the controller is non-functional and is disconnected from the negative power while the controller is functional. While the controller is non-functional and upon the base terminal of the second transistor being connected to the positive power via the switch, the second transistor turns on causing the first power element input to connect to the negative power. The water sensor has a first sensor contact connected to the negative power and a second sensor contact. Upon water contacting the water sensor, the sensor contacts connect such that the second sensor contact connects to the negative power. The third transistor has a base terminal connected to the first switch contact via a diode. The collector-emitter path of the third transistor is connected in parallel to the power element inputs. The base terminal of the third transistor is connected to the second water sensor contact. While the controller is non-functional and while the switch is non-actuated and upon the base terminal of the third transistor being connected to the negative power via the water sensor, the third transistor turns on causing the power element to be short-circuited such that the power element is prevented from driving the motor.

The design of the electric circuit arrangement in accordance with the present invention is advantageous in that the circuit arrangement can be used in an identical form for both the opening and closing functions of a motor vehicle unit to be actuated such that one duplication of this basic circuit arrangement provides the complete function.

BRIEF DESCRIPTION OF THE DRAWINGS

The FIGURE illustrates a schematic diagram of an electric circuit arrangement in accordance with an embodiment of the present invention.

DETAILED DESCRIPTION OF THE PREFERRED EMBODIMENT(S)

The electric circuit arrangement in accordance with the present invention can be used in an identical form for both the opening and closing functions of a motor vehicle unit (e.g, window, sliding roof, etc.) to be actuated. As such, the circuit arrangement is illustrated only once in the FIGURE and, by way of example, is described herein as being used in the opening function mode.

As shown in the FIGURE, the circuit arrangement includes a controller 3 such as a micro-computer or microcontroller. Controller 3 includes inputs 3.11, 3.12, . . . , and 3.1*x* and outputs 3.21, 3.22, . . . , and 3.2*x*. The circuit arrangement further includes a manually actuated switch 2. Switch 2 may take the form of a pushbutton switch. The first of two ends of switch 2 is connected to the positive ("+") pole of a power supply associated with the electrical system of a motor vehicle. The second end of switch 2 is connected to input 3.11 of controller 3. Actuation of switch 2 connects the two ends of switch 2 together such that input 3.11 of controller 3 connects to the positive pole of the power supply.

An additional circuit arrangement for the closing function mode may make use of the same controller 3. For this purpose, controller 3 has the further inputs 3.1*x* and outputs 3.2*x* to which corresponding additional components are connected.

The circuit arrangement further includes a first switching transistor 4. The base terminal of first transistor 4 is connected to output 3.21 of controller 3. The emitter terminal of first transistor 4 is connected to the negative (i.e., ground) pole of the power supply.

The circuit arrangement further includes a power switching element 1. Power switching element 1 is associated on its output side with an electric motor (not shown). Upon being controlled by the circuit arrangement, the output side of power switching element 1 supplies power from the power supply to the electric motor for the electric motor to open (or close) the motor vehicle unit. Power switching element 1 is an electromechanical relay whose input side is formed by a relay coil. Power switching element 1 has first and second inputs 1' and 1" (i.e., first and second terminals of the relay coil) on its input side. First input 1' of power switching element 1 is connected to the collector terminal of first transistor 4. Second input 1" of power switching element 1 is connected to the positive pole of the power supply.

In the normal operation of the circuit arrangement, actuation of switch 2 causes a positive input signal from the positive pole of the power supply to be fed to input 3.11 of controller 3. In turn, controller 3 feeds a positive output signal via its output 3.21 to the base terminal of first transistor 4. The positive output signal fed to the base terminal of first transistor 4 causes the first transistor to connect through and be switched on. As a result, current from the positive pole of power supply flows through second input 1", the relay coil, and first input 1' of power switching element 1 and through first transistor 4 to ground. As a result, power switching element 1 actuates the electric motor causing the electric motor to operate in the appropriate direction. In turn, the motor vehicle unit opens or closes depending upon the operating direction of the electric motor.

The emergency operation of the circuit arrangement is different than the normal operation of the circuit arrangement. The emergency operation of the circuit arrangement occurs upon the failure of controller 3. Controller 3 may fail, for example, when the circuit arrangement is immersed in water or salt water as a result of the motor vehicle being immersed in the water.

During failure or potentially likely failure of controller 3, the emergency operation of the circuit arrangement ensures that no unintentional actuation of power switching element 1 occurs. To this end, the circuit arrangement further includes a third switching transistor 6 and a water sensor 8. The collector and emitter terminals of third transistor 6 are respectively connected to first and second inputs 1' and 1" of power switching element 1. That is, the collector emitter path of third transistor 6 is mounted parallel to inputs 1' and 1" of power switching element 1. In the connected state of third transistor 6, the collector emitter path of the third transistor short-circuits power switching element 1 such that no unintentional actuation of power switching element 1 can occur.

Water sensor 8 includes two closely adjoining, non-contacting electrical contacts 8' and 8". Contact 8" is connected to the negative (i.e., ground) pole of the power supply. Upon water such as salt water contacting water sensor 8, the conductivity of the water establishes a conductive path between electrical contacts 8' and 8" such that the electrical contacts are electrically connected to one another. As a result, contact 8" is effectively connected to the negative pole of the power supply.

The base terminal of third transistor 6 is connected to contact 8'. The connected state of third transistor 6 in which the collector emitter path of the third transistor short-circuits power switching element 1 occurs when contact 8' is effectively connected to the negative pole of the power supply as a result of water sensor 8 contacting water. This is because this causes the base terminal of third transistor 6 to be effectively connected to the negative pole of the power supply. Consequently, in the connected state, third transistor 6 connects through and is switched on thereby causing power switching element 1 to be short circuited as current from the positive pole of power supply flows through second input 1" and through the third transistor to ground. As a result, power switching element 1 cannot be unintentionally actuated.

Contacts 8' and 8" may be formed by adjoining surfaces on a printed circuit board or by pins situated in parallel. A design with pins may be advantageously configured such that the pins are positioned on the exterior of a housing and thus come into contact with water prior to the remaining circuit arrangement coming into contact with the water.

The circuit arrangement is configured to enable intentional activation of power switching element 1 when the circuit arrangement is in the emergency operation mode. To this end, the circuit arrangement further includes a second switching transistor 5 and a fourth switching transistor 9. Second transistor 5 is mounted in series with power switching element 1. Fourth transistor 9 is mounted in series with second transistor 5. The collector terminal of second transistor 5 is connected to the emitter terminal of third transistor 6 and first input 1' of power switching element 1. The emitter terminal of second transistor 5 is connected to the collector terminal of fourth transistor 9. The emitter terminal of fourth transistor 9 is connected to the negative (i.e., ground) pole of the power supply.

The second end of switch 2 is connected to the base terminal of second transistor 5 and is connected via a diode 7 to the base terminal of third transistor 6. As a result, actuation of switch 2, in order to intentionally activate power switching element 1, connects the base terminals of second transistor 5 and third transistor 6 to the positive pole of the power supply. This results in third transistor 6, which is mounted parallel to inputs 1' and 1" of power switching element 1, being blocked such that the third transistor does not short-circuit power switching element 1 while switch 2 is actuated. This further results in second transistor 5, which is mounted in series with power switching element 1, to be connected to the negative (i.e., ground) pole of the power supply such that current flows through the relay coil of the power switching element while switch 2 is actuated. As a result, power switching element 1 actuates the electric motor causing the electric motor to operate in the appropriate direction to open the motor vehicle unit while switch 2 is actuated during the emergency operation mode of the circuit arrangement.

Fourth transistor 9 serves to cut-off the activation path provided by second transistor 5 during normal operation of the circuit arrangement as the activation path is blocked by controller 3. The base terminal of fourth transistor 9 is connected by a pull-up resistor 10 to the positive pole of the power supply and is connected to output 3.2*x* of controller 3. During normal operation of controller 3, the controller outputs via output 3.2*x* a positive signal to the base terminal of fourth transistor 9 such that the fourth transistor is turned off. As a result, fourth transistor 9 cuts off the activation path provided by second transistor 5 from the negative (i.e., ground) pole of the power supply. If controller 3 fails, fourth transistor 9, which is connected by pull-up resistor 10 to the positive pole of the power supply, connects through and is turned on thereby allowing the flow of current to the negative (i.e., ground) pole of the power supply. As a result, the activation path provided by second transistor 5 is enabled and current is able to flow to ground during the emergency operation mode of the circuit arrangement.

The base terminal of first transistor 4, which in normal operation causes the relay coil current to be switched on, is additionally connected via a Schottky diode 11 to the collector terminal of fourth transistor 9. This prevents unintentional switching of first transistor 4 by water resistance, which could possibly short-circuit the base terminal of first transistor 4 toward the positive pole of the power supply.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An arrangement for controlling a power element associated with a motor used to adjust a motor vehicle unit, wherein the power element includes first and second inputs with the first input connectable to negative power and the second input connected to positive power, wherein the power element drives the motor when the first input is connected to the negative power and the second input is connected to the positive power, the arrangement comprising:

a switch which connects to the positive power upon manual actuation;

a controller connected to the switch;

a first transistor connected to the switch via the controller, the first transistor connected in series with the power element such that the first transistor is connected between the first power element input and the negative power, wherein the first transistor turns on causing the first power element input to connect to the negative power upon manual actuation of the switch while the controller is operational;

a second transistor connected directly to the switch, the second transistor connected in series with the power element such that the second transistor is connected between the first power element input and the negative power when the controller is non-operational, wherein the second transistor turns on causing the first power element input to connect to the negative power upon manual actuation of the switch while the controller is non-operational;

a water sensor which connects to the negative power upon contact with water; and a third transistor connected to the switch via a diode and connected to the water sensor, the third transistor connected in parallel with the power element such that the collector emitter path of the third transistor is connected in parallel to the power element inputs, wherein the third transistor turns on causing the power element to be short-circuited such that the power element is prevented from driving the motor upon water contacting the water sensor while the controller is non-operational and while actuation of the switch is void.

2. The arrangement of claim 1 further comprising:

a fourth transistor connected to the controller, the fourth transistor connected in series between the second transistor and the negative power, wherein controller turns off the fourth transistor such that the first power element input is disconnected from the negative power via the second transistor while the controller is operational.

3. The arrangement of claim 2 wherein:

the fourth transistor is connected to the positive power via a pull-up resistor, wherein the positive power connected to the fourth transistor causes the transistor to turn on while the controller is non-operational such that the second and fourth transistors are connected to the negative power causing the first power element input to be connected to the negative power.

4. The arrangement of claim 1 wherein:

the power element includes an electromechanical relay connected between the power element inputs.

5. The arrangement of claim 1 wherein:

the controller includes a micro-processor.

6. The arrangement of claim 1 wherein:

the switch includes a pushbutton switch.

7. The arrangement of claim 1 wherein:

each transistor is a npn bipolar transistor.

8. An arrangement for controlling a motor used to adjust a motor vehicle unit, the arrangement comprising:

a power element having a first input connectable to negative power and a second input connected to positive power, wherein the power element drives the motor upon the first input being connected to the negative power;

a switch which connects to the positive power upon manual actuation;

a controller connected to the switch;

a first transistor connected to the controller and connected in series with the power element such that the first transistor is connected between the first power element input and the negative power;

wherein while the controller is functional and upon the controller being connected to the positive power via the switch, the controller turns on the first transistor causing the first power element input to connect to the negative power;

a second transistor connected to the switch and connected in series with the power element such that the second transistor is connected between the first power element input and the negative power when the controller is non-functional;

wherein while the controller is non-functional and upon the second transistor being connected to the positive power via the switch, the second transistor turns on causing the first power element input to connect to the negative power;

a water sensor which connects to the negative power upon contact with water; and a third transistor connected to the switch and the water sensor and connected in parallel with the power element such that the collector emitter path of the third transistor is connected in parallel to the power element inputs;

wherein while the controller is non-functional and while the switch is non-actuated and upon the third transistor being connected to the negative power via the water sensor, the third transistor turns on causing the power element to be short-circuited such that the power element is prevented from driving the motor.

9. The arrangement of claim 8 further comprising:

a fourth transistor connected to the controller and connected in series with the second transistor such that the fourth transistor is connected between the second transistor and the negative power while the controller is functional, wherein the base terminal of the fourth transistor is connected via a pull-up resistor to the positive power and is connected via the controller to the negative power while the controller is functional.

10. The arrangement of claim 9 wherein:

the base terminal of the first transistor is connected to the collector terminal of the fourth transistor.

11. The arrangement of claim 8 wherein:

the power element includes an electromechanical relay between the power element inputs.

12. The arrangement of claim 8 wherein:

the controller includes a micro-processor.

13. The arrangement of claim 8 wherein:

the switch includes a pushbutton switch.

14. The arrangement of claim 8 wherein:

each transistor is a npn bipolar transistor.

15. An electric circuit arrangement for controlling a motor used to adjust a motor vehicle unit, the arrangement comprising:

a power element having a first input connectable to negative power and a second input connected to positive power, wherein the power element drives the motor when the first input is connected to the negative power;

a controller having an input and an output;

a switch having a first switch contact connected to the controller input and a second switch contact connected to the positive power, wherein upon manual actuation of the switch the switch contacts connect such that the first switch contact connects to the positive power;

a first transistor having a base terminal connected to the controller output, an emitter terminal connected to the negative power, and a collector terminal connected to the first power element input;

wherein while the controller is functional and upon the controller input being connected to the positive power via the switch, the controller outputs a control signal from the controller output to the base terminal of the first transistor to turn on the first transistor causing the first power element input to connect to the negative power;

a second transistor having a base terminal connected to the first switch contact, an emitter terminal, and a collector terminal connected to the first power element input, wherein the emitter terminal of the second transistor is connected to the negative power while the controller is non-functional and is disconnected from the negative power while the controller is functional;

wherein while the controller is non-functional and upon the base terminal of the second transistor being connected to the positive power via the switch, the second transistor turns on causing the first power element input to connect to the negative power;

a water sensor having a first sensor contact connected to the negative power and a second sensor contact, wherein upon water contacting the water sensor the sensor contacts connect such that the second sensor contact connects to the negative power; and a third transistor having a base terminal connected to the first switch contact via a diode and a collector emitter path connected in parallel to the power element inputs, wherein the base terminal of the third transistor is connected to the second water sensor contact;

wherein while the controller is non-functional and while the switch is non-actuated and upon the base terminal of the third transistor being connected to the negative power via the water sensor, the third transistor turns on causing the power element to be short-circuited such that the power element is prevented from driving the motor.

16. The arrangement of claim 15 further comprising:

a fourth transistor having a collector terminal connected to the emitter terminal of the second transistor, an emitter terminal connected to the negative power, and a base terminal connected via a pull-up resistor to the positive power, wherein the base terminal of the fourth transistor is further connected via the controller to the negative power while the controller is functional.

17. The arrangement of claim 16 wherein:

the base terminal of the first transistor is connected to the collector terminal of the fourth transistor.

18. The arrangement of claim 15 wherein:

the power element includes an electromechanical relay between the power element inputs.

19. The arrangement of claim 15 wherein:

the controller includes a micro-processor.

20. The arrangement of claim 15 wherein:

the switch includes a pushbutton switch.

* * * * *